(No Model.)

5 Sheets—Sheet 1.

C. C. SMALL.
NAIL MAKING AND DISTRIBUTING MACHINE.

No. 375,209.

Patented Dec. 20, 1887.

WITNESSES.

INVENTOR.

(No Model.) 5 Sheets—Sheet 2.

C. C. SMALL.
NAIL MAKING AND DISTRIBUTING MACHINE.

No. 375,209. Patented Dec. 20, 1887.

WITNESSES.

INVENTOR.

(No Model.) 5 Sheets—Sheet 4.

C. C. SMALL.
NAIL MAKING AND DISTRIBUTING MACHINE.

No. 375,209. Patented Dec. 20, 1887.

WITNESSES
J. N. Dolan,
Fred B. Dolan,

INVENTOR
Chester C. Small
by his attys
Clarke & Raymond.

(No Model.)
C. C. SMALL.
NAIL MAKING AND DISTRIBUTING MACHINE.
No. 375,209. Patented Dec. 20, 1887.
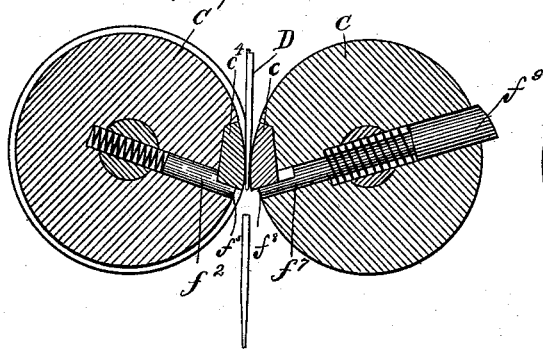
Fig. 8.
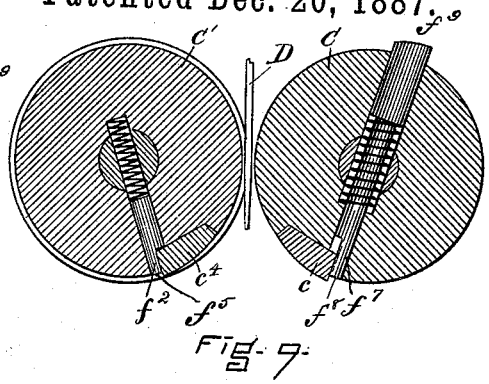
Fig. 9.
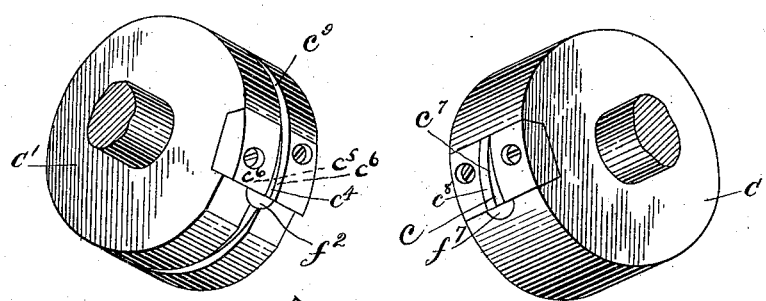
Fig. 10.  Fig. 11.
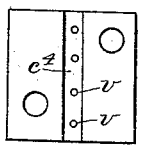
Fig. 14.
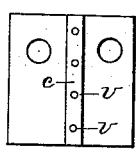
Fig. 15.
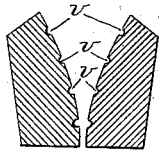
Fig. 16.
Fig. 12.  Fig. 13.  Fig. 17.
WITNESSES.
J. M. Dolan,
Fred. B. Dolan.
INVENTOR.
Charles C. Small
by his attys
Clarke & Raymond United States Patent Office.

CHESTER C. SMALL, OF MALDEN, ASSIGNOR TO FREEBORN F. RAYMOND, 2D, OF NEWTON, MASSACHUSETTS.

NAIL MAKING AND DISTRIBUTING MACHINE.

SPECIFICATION forming part of Letters Patent No. 375,209, dated December 20, 1887.

Application filed April 21, 1887. Serial No. 235,648. (No model.)

*To all whom it may concern:*

Be it known that I, CHESTER C. SMALL, of Malden, in the county of Middlesex and State of Massachusetts, a citizen of the United States, have invented a new and useful Improvement in Nail Making and Distributing Machines, of which the following is a full, clear, and exact description, reference being had to the accompanying drawings, forming a part of this specification, in explaining its nature.

The invention embraces a machine for making nails from wire and for delivering them in successive order to a nail-distributer having a single nail conducting or guiding tube the upper end of which is held in substantially a uniform position and the lower end of which is guided and moved by suitable mechanism to bring the delivery end of the tube into any desired place or sequence of places for the delivery of nails.

It further relates to the combination of the nail-distributer with a nail-carrier.

It further relates to various features of construction and organization, which will hereinafter be explained.

The devices for forming the nails comprise two rolls, each of which has a point swaging or forming die, feed-rolls for feeding the wire thereto, and a cutter to sever the pointed nail from the wire.

Figure 1:
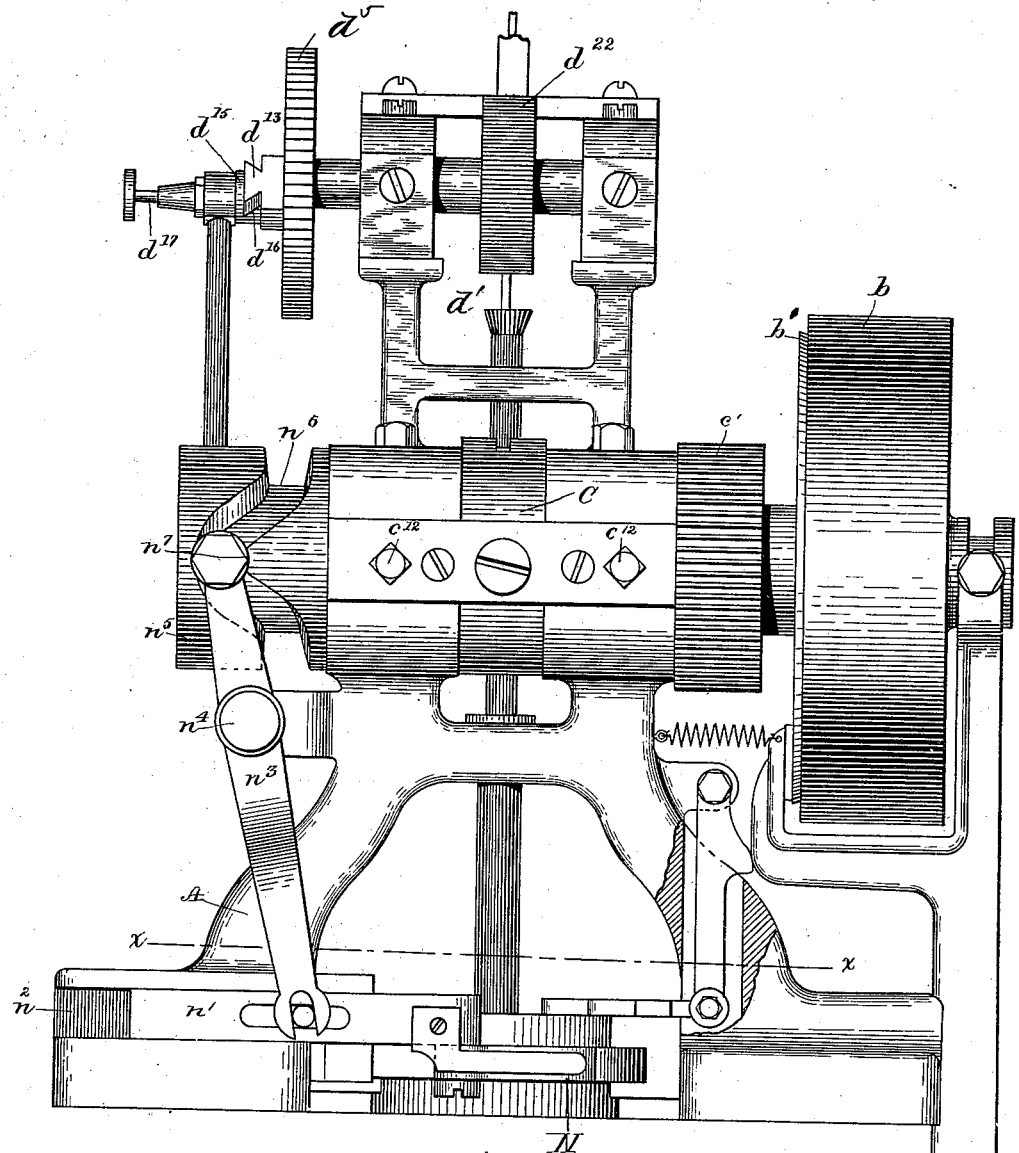
Figures 2, 6:
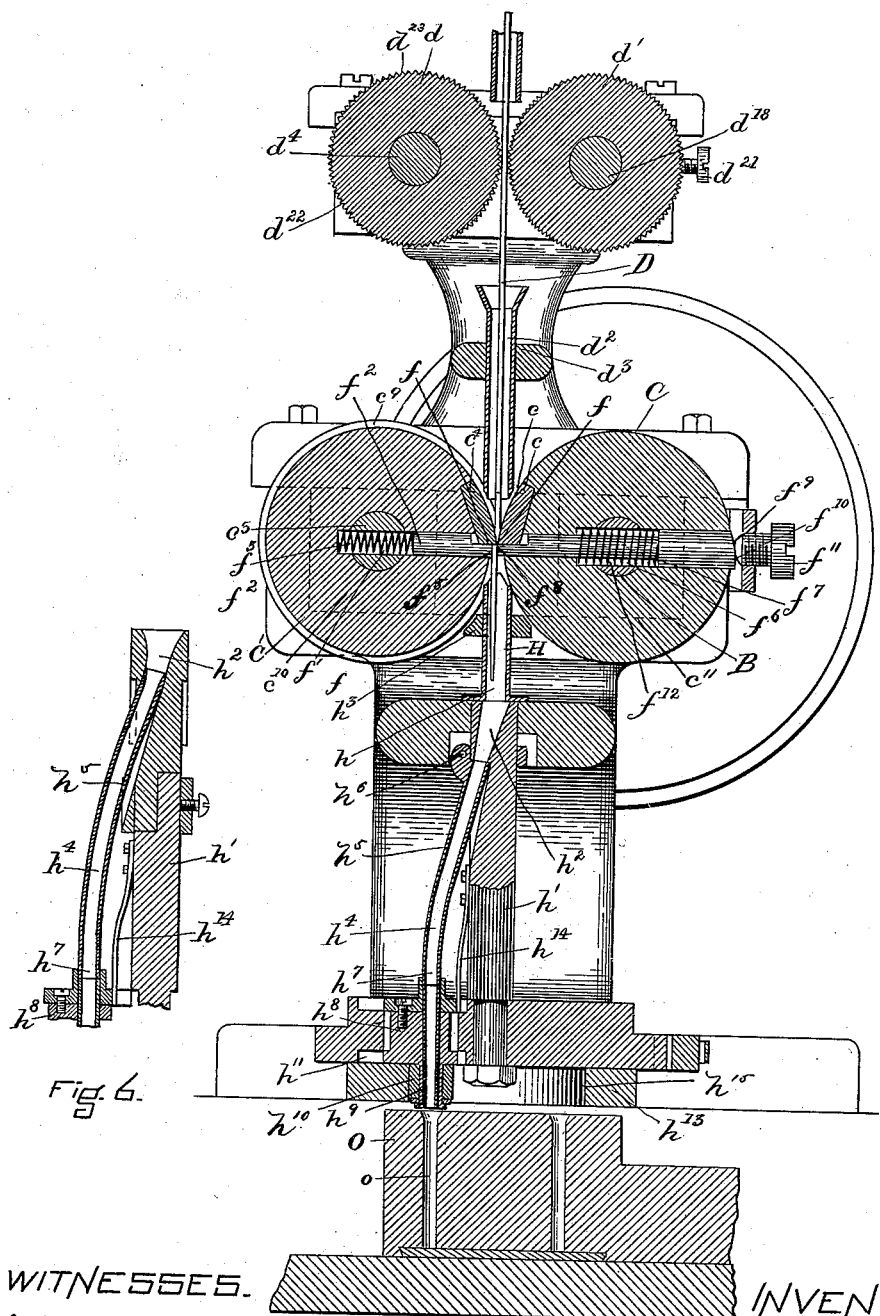
Figure 3:
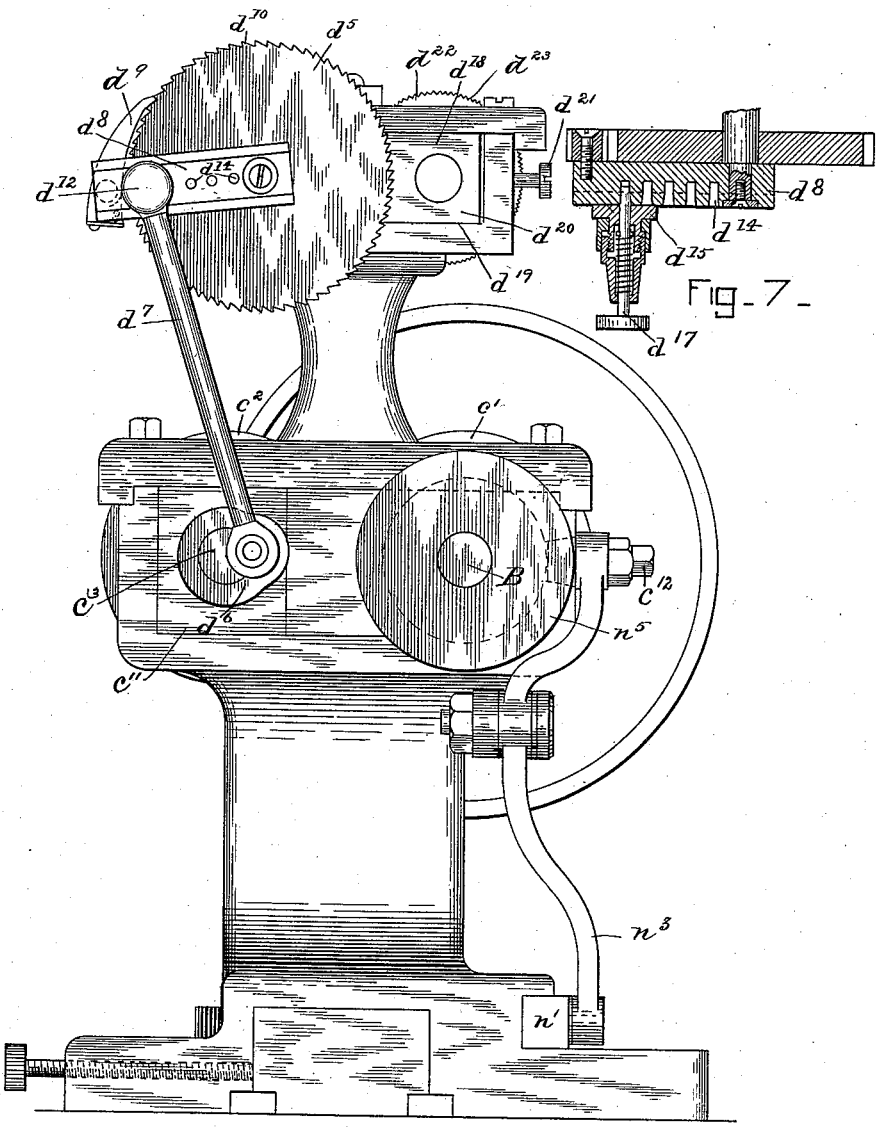
Figure 4:
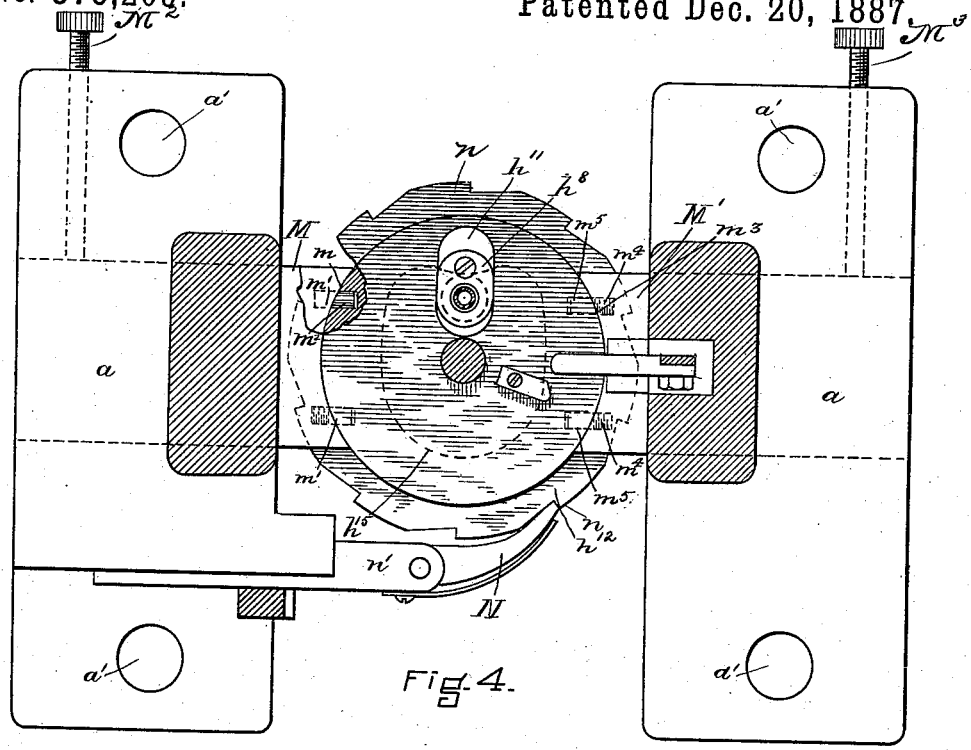
Figure 5:
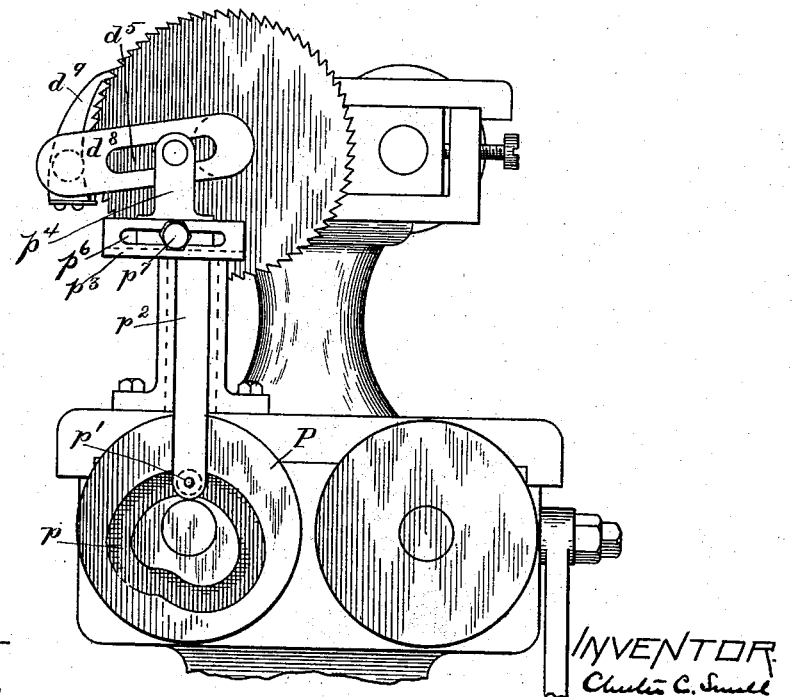

In the drawings, Figure 1 is a view in front elevation of the machine. Fig. 2 is a vertical central section thereof. Fig. 3 is an elevation of the end at the left of the view represented in Fig. 1. Fig. 4 is a view in section upon the dotted line $x\,x$ of Fig. 1 and in plan of the parts below said line. Fig. 5 is a view in end elevation of a modified form of the feed-roll-operating mechanism, to which reference will hereinafter be made. Fig. 6 is a detail view representing a modified form of device for holding the distributing-tube of the distributer. Fig. 7 is a sectional view illustrating the adjustable connection between the feed-pawl lever and the arm or link operating it. Fig. 8 is a view in section of the pointing-dies, their holding-rolls, and the cut-off mechanism, showing the position of the parts immediately after the severing of a nail. Fig. 9 is a view of the parts shown in Fig. 8, with the exception of the severed nail, illustrating the position of the dies in relation to the wire after the drawing of the point upon the end of the wire. Fig. 10 is a view in perspective of the box-die and its holding-roll. Fig. 11 is a view in perspective of the male die and its holding-roll. Fig. 12 is a detail view representing the nail cut-off or severing devices as also used to form indentations or holding projections upon the head of the severed nail. Fig. 13 represents a nail having its point drawn by the dies and its head provided with sharpened holding projections. Figs. 14, 15, and 16 represent the dies as provided with shallow depressions, to which reference is hereinafter made. Fig. 17 is a view in perspective of a nail made from wire substantially square in cross-section and unprovided with recesses or roughened or holding sections at the head.

A is the frame of the machine. It has the feet $a$, having bolt-holes $a'$, through which bolts for attaching it to the table of the nailing-machine are inserted. It supports the shaft B, which carries the pulley $b$, which is free to revolve thereon, and which forms one member of a clutch and is arranged to slide thereon to and from the fast member $b'$ of the clutch. The shaft B also carries the roll C, having the nail-pointing die $c$, and the gear $c'$, which meshes with the gear $c^2$ upon the shaft $c^3$, which carries the roll C', having a nail-pointing die $c^4$. The rolls C C' are placed opposite each other and the dies $c\,c^4$ are secured to the roll, so that they are brought together once in every complete revolution of the roll. The die $c^4$, preferably, is a box or female die—that is, it has the die-surface $c^5$ and the walls $c^6$. (See Fig. 10.) The die $c$ is a male die—that is, it has the rib or extension $c^7$, having the forming-surface $c^8$, and which is of a width to shut between the walls $c^6$ of the box-die.

The surface of the roll C is plain. There is formed in the surface of the roll C' a groove, $c^9$, which is of a depth and width sufficient to receive the wire and hold the wire without bearing upon any part thereof with sufficient force to feed it. Each roll has a recess, in which the respective die-blocks are fastened by screws, (see Figs. 10 and 11,) and the forming-surfaces of the die may be of any desired length or shape to give the nail a short, medium, or long point, and also to form indentations therein or projections thereon, if desired.

The shaft B is mounted upon the blocks $c^{10}$, which are adapted to be moved in the bearings $c^{11}$ in the frame a limited distance, and set-screws $c^{12}$ bear against these blocks and serve to adjust the position of the shaft and the roll which it carries horizontally in relation to the shaft $c^3$ and roll C', so that the dies may be set toward or from each other to vary their position in relation to each other, and to thereby vary the length and thickness of the point of the nail.

The wire D is fed from a reel (not shown) by the feed-rolls $d$ $d'$, through the hole $d^2$ in the guide-tube $d^3$, to the dies. The feed-roll $d$ is mounted upon a shaft, $d^4$, which carries at one end the ratchet-wheel $d^5$. This ratchet-wheel is caused to be turned to rotate the feed-roll $d$ and cause it to feed the nail intermittingly, and it is operated after the point has been formed by the rotation of the dies $c$ $c^4$.

In Fig. 3 I have shown the ratchet-wheel as operated by a crank, $d^6$, on the shaft $c^3$, a rod, $d^7$, connecting the crank with a lever, $d^8$, secured to the end of the shaft $d^4$, to turn thereon, and supporting at its end the feed-pawl $d^9$. This feed-pawl is held in contact with the teeth $d^{10}$ of the ratchet-wheel by means of a spring, $d^{11}$. The end $d^{12}$ of the link or connecting rod $d^7$ is movable upon the holding lever or arm $d^8$ toward and from the center of the feed-pawl to vary the degree or extent of the movement of the arm, and consequently of the feed-pawl and feed-roll.

I have represented the arm $d^8$ as having a dovetail tongue, $d^{13}$, in which are formed the holes $d^{14}$, and the upper end of the connecting-rod $d^7$ as having a block, $d^{15}$, provided with a dovetail recess, $d^{16}$, which is arranged to slide upon the dovetail tongue $d^{13}$, and as having a spring-pin, $d^{17}$, which is adapted to engage one of the holes $d^{14}$ and lock the end of the connecting-rod to the pawl in any desired position in relation to its center.

The feed-roll $d'$ is mounted upon a shaft, $d^{18}$, which has bearings $d^{19}$ in the blocks $d^{20}$, and the position of the feed-roll $d'$ in relation to the roll $d$ is adjusted by means of the set-screws $d^{21}$, which are arranged to bear against the blocks $d^{20}$ and move them in their bearings $d^{19}$. The feed-rolls are preferably rolls without grooves, having simply cross-recesses $d^{22}$, which form sharp ridges $d^{23}$, and the rolls are made wide, and also, if desired, movable upon their holding-shafts, so that any part of the surface may be utilized for feeding the wire. The nail is severed from the end of the wire immediately after it has been pointed and fed, and preferably during the formation of the point of the second or next nail in order—that is, the first nail is not severed until the point of the second nail is partially formed—and I prefer to use the dies themselves as a portion of the severing mechanism. The best time to use them for this purpose is when they are in the position represented in Fig. 2—that is, when their under surfaces, $f$, are on the same horizontal line. To enable the die-blocks to be used in this way, their under surface, $f$, must be square, and there is formed in each roll adjacent to said under surface a recess which in one case extends through the roll and roll-shaft, forming a hole through them, and in the other case enters the roll-shaft, but does not extend through the roll. The hole $f'$ in the roll C' holds a movable anvil or block, $f^2$, which is free to move in the hole a limited distance, being pushed outward by a coiled spring, $f^3$, placed in the hole behind it, so that its normal position is that in which it is forced by the pressure of the spring $f^3$. It works upon the under surface of the die $c^4$—that is, it is movable horizontally thereon—and its face $f^5$ acts as an anvil or block against which the head end of the nail is moved while it is being severed.

The hole $f^6$ of the roll C holds a movable block, $f^7$, which substantially fills the hole, so that its front face, $f^8$, is below the surface $f$ of the die $c$. Its rear end, $f^9$, projects from the roll sufficiently to come in contact with a stationary cam, $f^{10}$, which is formed upon the end of an adjustable block or screw-stud, $f^{11}$, so that it may be moved horizontally toward and from the roll. This block $f^7$ is movable outward in relation to the die $c$ in opposition to the spring $f^{12}$, and in the operation of the machine, when the dies have reached the position shown in Fig. 2 and their under surfaces are upon the same line, the movable block $f^7$ is caused by the contact of its end $f^9$ with the cam to be moved outward from the roll C along the under surface of the die-block $c$ against the head of the nail, moving it against the anvil or face of the block $f^2$ in the roll C' and causing it to be severed from the point which is being formed upon the wire, the dies $c$ $c^4$ acting as a holding device while this movement takes place, and the lower outer edge of the box-die $c^4$ acting as a severing-block.

I would say that it is not always essential or necessary to use the block $f^2$ of the severing mechanism. I would also say that the movement of the block $f^7$ to sever the nail takes place during the rotation of the die-rolls. In other words, the rolls are not stopped in their rotation to permit this movement to take place. This I am enabled to do because the movement given to the cutting form or block is very slight and is given very quickly.

Below the meeting points of the rolls is a conducting-tube, H, through which the nails drop after they are severed to the distributer. (See Fig. 2.)

The distributer has a rotary post, $h'$, in the upper end of which is formed an inclined hole, $h^2$, which is a continuation of the passage $h$ in the tube H. The tube H is supported by a bracket, $h^3$. Extending from the lower end of the inclined hole $h^2$ in the upper end of the post $h'$ is a curved conducting-tube, $h^4$, which is curved or inclined from a perpendicular, and which has the passage $h^5$. (See Fig. 2.) This curved tube is hinged to the post $h'$ at $h^6$, so that the degree of its inclination may be varied, and it is connected at its lower end, $h^7$, with the slide-block $h^8$, which has a hollow stud, $h^9$, carrying a cam-roll, $h^{10}$. (See Fig. 2.) The connection of the tube $h^7$ with the slide-block is loose or free to permit a slight variation of its inclination as it is moved from one position to another, as will hereinafter appear, without binding upon the block. The slide-block $h^8$ is adapted to be moved in the radial slot $h^{11}$, formed in the ratchet-wheel $h^{12}$, attached to said post $h'$. This movement is effected by the cam pattern or guide $h^{13}$ and the spring $h^{14}$, which serves to hold the cam-roll $h^{10}$ in contact with the guiding-surface $h^{15}$ of the cam or pattern $h^{13}$. The guiding surface or edge $h^{15}$ of the cam or pattern $h^{13}$ varies in form and size generally according to the size of the heel to be nailed, and it is held to the frame of the nailing-machine, to be readily removed therefrom, by means of a clamp-plate, M, having the curved surface $m$ and the pins $m'$, which enter holes $m^2$ in the outer edge of the cam or pattern plate and the clamp-plate M', which also has a curved surface, $m^3$, and pins $m^4$, which enter holes $m^5$ in the edge of the cam or pattern plate. The clamp-plate M is locked in place by means of the locking-pin $M^2$, and the clamp-plate M' is locked in place by means of the locking-pin $M^3$.

The ratchet plate or wheel $h^{12}$ is supported in part by the cam or pattern plate $h^{13}$ and in part by the clamp-plates M M'. The ratchet plate or wheel has the ratchet-teeth $n$ in its outer edge or surface, with which a pawl, N, is arranged to engage. This pawl is attached to a slide-block, $n'$, arranged to be moved in the horizontal ways $n^2$, and reciprocated or moved by the lever $n^3$, pivoted at $n^4$, and a cam, $n^5$, upon the shaft B, and having a cam-groove, $n^6$, which receives the cam-pin $n^7$ upon the upper end of the lever.

The distributing-tube is adapted to deliver nails into any desired position or place, and it may be positively moved from one position to another to deliver nails in successive order to various positions, or it may be adjusted by hand from one place to another, according to the use to which the distributer is put and the place where it is desired to deliver the nails. I have represented the distributer as adapted to deliver nails to the nail-carrier of a heel-nailing machine of the character described in Patent No. 317,199, and have shown in Fig. 2 a nail carrier, O, below the distributer and in a position to receive nails therefrom. This nail-carrier has the holes $o$, having the arrangement in which it is desired the nails shall be driven into the heel-blank, and the carrier serves to receive the nails one by one from the distributer and to transfer them to the nail-driving devices.

The cam or pattern illustrated is of a shape to cause the distributing-tube as it is moved or turned to be brought into position in successive order over the various holes of the nail-carrier, and the ratchet-feed is of a length to move the tube the distance between the two holes of the carrier upon every reciprocation or movement thereof.

In lieu of hinging the conducting-tube $h^4$ of the distributer to the post, as above specified, it may be attached to the other parts of the distributer, as represented in Fig. 6, where the tube, instead of being hinged to the stud $h'$, has its upper end extending into the hole $h^2$, which is enlarged sufficiently to receive it, and its lower end extends into the block $h^8$, the connections of the tube $h^4$ with the block $h^8$ and with the stud being sufficiently loose or free to permit the movement of the lower end of the tube, as above explained. In order that the tube may be made readily removable without disengaging or moving the distributer from the frame of the machine, I have made the modification represented in Fig. 6 in two parts, so that the upper part of it can be lifted slightly from the lower part upon being released therefrom to disengage it from the upper end of the conducting-tube $h^4$. The two parts of the spindle or stud are locked together in any desired way, and I have shown for this purpose a clamp which embraces both parts and a locking-screw.

In lieu of the feed-operating crank and lever above described, and shown in Fig. 3, I may employ the construction shown in Fig. 5, involving the use of the cam P upon the shaft $c^3$, having a cam-groove, $p$, which receives the cam-pin $p'$ on a slide-bar, $p^2$. This slide-bar carries at its upper end a cross-block, $p^3$, in which there is horizontally adjustable a short connecting-bar, $p^4$, which is connected with the lever $d^8$, carrying the pawl $d^9$.

The lever, instead of having pins, as above described, has the long slot $p^5$, which receives the connecting-pin of the slide-bar. The position of the slide-bar upon the block of the connecting-rod is varied or adjusted by means of the slot $p^6$, formed therein, and the locking-screw $p^7$. By varying the position of this connecting-bar in relation to the slide-bar the throw of the pawl-lever is caused to be varied. By using a cam for controlling the pawl-lever, instead of a crank, I am enabled to make an additional movement of the feed-rolls for the purpose of moving the wire downward immediately following the severing of the nail or while the bite of the dies upon the wire is comparatively slight, or as represented in Fig. 2. There may be, under certain conditions, a tendency of the dies to slip upon the end of the wire at this instant. To overcome this tendency or prevent their slipping by means of the cam, I operate the feed-rolls to force the wire downward, so that it is moved with the dies and the dies are forced to bite it and form the point. This movement, however, is very slight and does not constitute any part of the other movement of the feed-rolls which govcerns the length of the nail. Of course this movement of the wire at this time may be provided by means independent of the feed-rolls and which grasp the wire and move it into and with the dies; but I prefer to use the feed-rolls, because it simplifies the construction.

The operation of the machine is as follows: The wire is run from a suitable reel between the feed-rolls through the passage therefrom to a point between the two rolls. The rolls, rotating, bring the dies together upon the end of the wire and form a point, the wire of course being drawn by the rolls from the reel as the point is being formed, and also being elongated by the action of the rolls. This moves the wire down to the position shown in Fig. 9, and the dies then leave the wire, and the rolls, constantly rotating, bring the dies again into position to again form another point upon the wire above the point first formed. If the wire were not fed during this interval of time—that is, during the time that the dies were turning after they have completed the first point to the time that they come together to form the second point—then the second point would be formed in the wire at the end of the first point; but, as a rule, the nail must have a shank of greater or less length extending from the end of the point, and it is necessary, therefore, to feed the wire after the first point has been formed and after the dies have left the point, and for this purpose (although the rolls carrying the dies can be used also for feeding the wire, still, as a variation in the extent of this feed cannot be readily obtained, I prefer to employ an independent feed more easily regulated) the feed is operated to move the wire, after the dies have formed a point, between the rolls to any desired extent. The point-forming dies then come together again to form the point of the second nail in order, and when their lower ends have been moved together as closely as they will be in the forming of the point—that is, a position which brings the lower edge of each die-block upon the same line and upon a line with the center of the rolls—the first pointed nail-blank is detached or severed from the wire by causing the cutter or severing block to be moved from one of the rolls against the upper end of the nail-blank at right angles to the line of movement of the wire, and as the wire has been reduced in thickness at this point by the previous action of the point-forming rolls the extent of movement of the cutter or severing block required is very slight, so that I am enabled to give a block or cutter this movement across the under surface of the dies and to use the dies at that instant as a part of the severing mechanism, the dies serving to hold the wire while the nail is being cut, although the rotation of the rolls is not checked and the forming of the point of the next nail in order is proceeding. The formed nail thus severed immediately drops through the conducting-passage of the movable tube of the distributer to a hole in the nail-carrier, and after it has left the tube, and before another nail is formed and severed, the distributing-tube has been moved to bring its hole or passage into register with another hole in the nail-carrier, the tube being moved by the ratchet wheel or plate which supports its lower end, and also by the spring $h^{14}$, which governs its position in relation to the guiding-surface of the cam or pattern—that is, the spring and guiding-surface of the cam or pattern act to govern the line of movement upon which the distributing-tube travels, while the cam and feed pawl serve to govern the length of the movement.

Of course, for certain purposes, in lieu of a spring a cam-groove may be used instead of a cam or pattern plate having one guiding-surface; but when the distributer is used upon a heel-nailing machine the construction employing the spring is the best, because by it I can, by simply changing the pattern or cam plate, and, when necessary, the extent of the movement of the feed-pawl, use the same distributer for delivering nails to different nail-carriers having holes of any desired arrangement and of any desired number. The nail cut-off or severing block or blocks may be used also for forming teeth, notches, serrations, or indentations in the upper part of the shank of the nail at the time that the nail-blank is severed from the wire by making in the block the form of die necessary or desired, and by providing the block $f^2$ with a rigid backing or support, so that the heading of the shank of the nail is caused to be squeezed or compressed between two surfaces of the blocks. This construction is represented in Fig. 12, and a nail having one form of indentation made thereby is represented in Fig. 13.

I would say that I do not confine myself to the especial form of operating the wheel or plate carrying the nail-distributing-tube slide-block. I would further say that this construction can be employed without a positive feed for moving the distributing-tube with an intermittent movement, and even without the cam or pattern, although for most uses the cam or pattern is desirable. The distributer when so used is employed for the purpose of changing the point at which nails are delivered, and not for the purpose of delivering or distributing them in successive order to a line of receiving-holes.

The nail-making devices of course may be used without the distributer, and the distributer may be used in connection with any other form of nailing mechanism.

The extent of the throw of the feed-pawl N may be regulated by making the fulcrum of the lever $n^3$ adjustable, so as to vary the extent of movement of its lower end, or by using the adjustable plate for covering the ratchet-teeth upon which the pawl is adapted to ride or move during a portion of its stroke.

Any suitable stop-motion mechanism may be used, and the one illustrated is substantially like that shown and described in Patent No. 317,199.

To prevent the dies from slipping on the end of the wire after a nail has been severed, I may use, instead of the wire-feed above described, projections or recesses formed in the faces of the die to engage the wire and prevent its slipping from the dies or the slipping of the dies in relation to it, and the form of construction which I prefer is represented in Fig. 16; and it consists in a number of shallow circular or hemispherical recesses, $v$, formed in the working-faces of the dies. In the drawings I have shown each die-face as provided with four of these shallow recesses $v$, and in Fig. 17 I have represented a nail the point of which was drawn by these dies. The operation of the dies when thus constructed is as follows: The first nail in order having been pointed and fed, the dies close upon the wire to form the point of the second nail and draw the wire or move it slightly, and the previously-pointed nail-blank is then severed without stopping the action of the dies, and their drawing movement upon the wire continues. If on account of their inclination they do not at this instant have a sufficient grip upon the wire to hold it, they are liable to slip on the wire, if their surfaces are plain or smooth. If, however, there are projections or recesses formed upon the faces of the dies, so that the metal of the point about to be completed has entered these recesses, then the dies cannot slip upon the wire, but continue to act to draw the point.

Having thus fully described my invention, I claim and desire to secure by Letters Patent of the United States—

1. In a nail-forming machine, the nail-pointing roll C, having a plane surface, and the pointing-die $c$, extending therefrom and removably secured thereto, with the pointing-roll C′, having the groove $c^9$ in its periphery, and the removable box or female die $f^4$, as and for the purposes described.

2. In a nail-forming machine, the combination of the rolls C C′, the dies $c$ $c^4$, movable upon an arc of a circle in relation to each other, and a severing device or block movable across the point-forming ends of the die to sever a nail-blank therefrom while the point of the next nail in order is held by the dies, substantially as described.

3. In a nail-forming machine, the rolls C C′, having the point-forming dies $c$ $c^4$, and the nail-severing block or cutter carried by one of the rolls immediately adjacent to the point-forming end of its die and adapted to have a slight radial movement imparted to it at the instant the point-forming section of the dies are opposite each other, whereby the dies serve as one part of the nail-severing mechanism and the movable block as the other part of the same, substantially as described.

4. The combination, in a nail-forming machine, of the roll C, having a die, $c$, the roll C′ and its die $c^4$, the nail-severing block $f^7$, and mechanism for imparting to it a radial movement to sever the nail-blank from the wire while the point of the next nail in order is being formed, substantially as described.

5. The combination of the roll C, having the die $c$, and also having the hole $f^6$, in which is fitted a slide-block, $f^7$, one end of which is arranged to slide upon the under surface of the die $c$ and out from the end thereof, and the other end of which is adapted to be brought into contact with a projection or cam, $f^{10}$, and with the roll C′ and its die, and said projection or cam $f^{10}$, as and for the purposes specified.

6. The combination of the roll C, having the die $c$, and also having the hole $f^6$, in which is fitted a slide-block, $f^7$, one end of which is arranged to slide upon the under surface of the die $c$ and out from the end thereof, and the other end of which is adapted to be brought into contact with a projection or cam, $f^{10}$, said projection or cam $f^{10}$, and the roll C′ and its die, and means for adjusting the position of said projection or cam $f^{10}$, as and for the purposes specified.

7. The combination of the roll C, having the die $c$, and also having the hole $f^6$, in which is fitted a slide-block, $f^7$, one end of which is arranged to slide upon the under surface of the die $c$ and out from the end thereof, and the other end of which is adapted to be brought into contact with a projection or cam, $f^{10}$, the said projection or cam $f^{10}$, and a spring, $f^{12}$, for returning the block to its normal position, and the roll C′ and its die, as and for the purposes specified.

8. The combination, in a nail-forming machine, of the roll C, having the die $c$, the roll C′, having the die $c^4$, the movable cut-off block $f^7$, carried by the roll C, and the yielding block $f^2$, carried by the roll C′, as and for the purposes described.

9. The combination of the roll C′, having the die $c^4$ and a hole, $f'$, with an anvil, $f^2$, carried in the said hole and movable in relation to said die, as specified, and the roll C and its die, as and for the purposes specified.

10. The combination of the roll C′, having the die $c^4$ and a hole for receiving the movable block $f^2$, the said block and a spring, $f^3$, and the roll C and its die, as and for the purposes described.

11. The rolls C C′ and their point-forming dies $c$ $c^4$, movable in relation to each other, as specified, and the cut-off block or blocks immediately below said dies, one of which is movable in relation to said dies, and one or both of which have die projections upon their opposed surfaces, substantially as and for the purposes described.

12. The combination of the constantly-rotating roll C, having the point-forming die $c$, the constantly-rotating roll C′, having the point-forming die $c^4$, the said dies being shaped to form a point upon the wire, with wire-feeding rolls, a ratchet-wheel upon the shaft of one of the feed-rolls, a pawl for engaging the same, operated by a cam timed to rotate the feed-rolls and move the wire between the pointing-rolls C C' the length of a shank of a nail after the point has been formed and while the point-forming dies are rotating, and said cam, as and for the purposes specified.

13. The combination of the roll C, having the die $c$, the roll C', having the die $c'$, the severing-block or nail cut-off adapted to be moved in relation to the pointing-dies, as specified, and the wire-feed rolls $d$ $d'$, operated to feed the wire after the operation of the pointing-dies, as and for the purposes described.

14. In a nail feeding and distributing machine, in combination with nail-supplying devices, a nail-distributing tube the upper end of which is held in substantially a uniform position and the lower end of which is provided with a horizontal movement, whereby the upper end of its passage is adapted to receive nails delivered from a stationary nozzle, and the lower end of its passage is adapted to be moved to change or vary the point of delivery of the nail therefrom, as and for the purposes described.

15. The combination of devices for supplying nails in successive order to a distributer, with said distributer, comprising a single tube supported upon a rotary post or support having its upper end centrally located and its lower end free to be governed by a guide or cam, with said guide or cam, as and for the purposes specified.

16. A nail-distributer comprising a rotary support or frame and a tube mounted upon said rotary support or frame, its upper end being located at the center of rotation of the frame or support and its lower end or outlet being located out of said center, whereby upon a rotation of the frame or support the outlet is adapted to be moved from one position to another, in combination with nail-supplying devices and with a nail-carrier, as and for the purposes described.

17. A nail-distributer comprising a support or frame and a tube providing a nail-conducting passage and attached by a horizontal pivotal connection to said support or frame, whereby the upper end of said tube is substantially centrally located and the lower end of said tube is free to be moved radially to any desired position, substantially as and for the purposes specified.

18. The combination of a nail-distributer comprising a frame or support and a movable tube or case mounted thereon and having a nail-conducting passage, the lower end of which tube is radially movable, with a cam or pattern for governing the radial position of said tube, as and for the purposes described.

19. A distributer having a tube or casing forming a conducting-passage and carried by a support adapted to be rotated, and having its entrance to the passage centrally located and free to be moved, with a cam or pattern for governing the position of the said lower end, and a spring for maintaining the lower end in contact with the cam or pattern, substantially as specified.

20. A distributer having a tube or casing forming a conducting-passage and carried by a support adapted to be rotated, and having its entrance to the passage centrally located and free to be moved, with a cam or pattern for governing the position of the said lower end, a spring for maintaining the lower end in contact with the cam or pattern, and devices for automatically and intermittingly rotating the said support, as and for the purposes described.

21. A distributer having a tube forming a conducting-passage, supported by a frame or support adapted to be rotated, and having its upper end substantially centrally located and its lower end eccentrically located, with a removable cam or pattern plate for governing the radial position of the discharge end of the tube as it is rotated, as and for the purposes specified.

22. The combination, in a distributer, of a ratchet-wheel carrying a post and having a radial slot formed therein, a tube supported at its upper end by said post to bring its opening substantially central, and at its lower end attached to or connected with a block movable in said slot, a cam-pin attached to said block, and a cam or pattern against which the cam-pin is held, as and for the purposes specified.

23. The combination, in a distributer, of a ratchet-wheel carrying a post and having a radial slot formed therein, a tube supported at its upper end by said post to bring its opening substantially central, and its lower end attached to or connected with a block movable in said slot, a cam-pin attached to said block, and a cam or pattern against which the cam-pin is held, and a pawl provided with an intermittent movement to engage the teeth of said ratchet-wheel to rotate the same with an intermittent movement, as and for the purposes described.

24. The combination, in a nail-distributer, of a tube forming a conducting-passage and free to be moved at one end, with a stationary cam or pattern for governing the position of said free end of the tube, and a nail-carrier, substantially as described.

25. The combination, in a nail-distributing-machine, of a pattern or cam, $h^{11}$, having the holes $m^2$ $m^5$, with the clamping or holding plates M M', the plate M having the pins $m'$, which enter the holes $m^2$, and the plate M' having the pins $m^4$, which enter the holes $m^5$, as and for the purposes described.

26. The combination of a nail-carrier, O, having the holes $o$, with a nail-distributer consisting of a nail-conducting tube the upper end of which is centrally supported upon a rotating support and the lower end of which is radially moved in relation to said rotary support, and a device for rotating the support, and a cam or pattern for governing the radial position of the lower end of the tube, as and for the purposes described.

27. The pointing-dies having one or more slight projections or shallow recesses formed in their working-faces for the purpose of preventing the slipping of the dies in relation to the point during the drawing thereof, as and for the purposes specified.

Executed April 16, 1887.

CHESTER C. SMALL.

In presence of—
F. F. RAYMOND, 2d,
J. M. DOLAN,
FRED. B. DOLAN.